United States Patent
Sharma et al.

(12) 
(10) Patent No.: US 9,641,818 B1
(45) Date of Patent: May 2, 2017

(54) KINETIC OBJECT REMOVAL FROM CAMERA PREVIEW IMAGE

(71) Applicant: Adobe Systems Incorporated, San Jose, CA (US)

(72) Inventors: Ashutosh Sharma, Noida (IN); Damanjit Singh, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/088,289

(22) Filed: Apr. 1, 2016

(51) Int. Cl.
| | |
|---|---|
| H04N 5/232 | (2006.01) |
| H04N 9/74 | (2006.01) |
| H04N 5/14 | (2006.01) |
| G06T 7/20 | (2017.01) |
| H04N 9/68 | (2006.01) |
| G06F 3/0484 | (2013.01) |
| H04N 7/01 | (2006.01) |

(52) U.S. Cl.
CPC ............ *H04N 9/74* (2013.01); *G06T 7/2006* (2013.01); *H04N 5/147* (2013.01); *H04N 5/23293* (2013.01); *H04N 9/68* (2013.01); *G06F 3/04847* (2013.01); *H04N 5/23216* (2013.01); *H04N 7/0127* (2013.01)

(58) Field of Classification Search
CPC ...... H04N 9/74; H04N 5/147; H04N 5/23293; H04N 9/68; H04N 7/0127; H04N 5/23216; G06T 7/2006; G06F 3/04847
See application file for complete search history.

(56) References Cited

U.S. PATENT DOCUMENTS

| | | | |
|---|---|---|---|
| 4,925,294 | A | 5/1990 | Geshwind et al. |
| 6,133,946 | A | 10/2000 | Cavallaro et al. |
| 6,441,846 | B1 | 8/2002 | Carlbom et al. |
| 7,418,131 | B2 | 8/2008 | Wang et al. |
| 7,856,055 | B2 | 12/2010 | Zhou et al. |
| 8,121,347 | B2 | 2/2012 | Metaxas et al. |
| 8,249,299 | B1 | 8/2012 | Dhawan et al. |
| 8,615,111 | B2 | 12/2013 | Garten |

(Continued)

OTHER PUBLICATIONS

Criminisi et al., "Region Filling and Object Removal by Exemplar-Based Image Inpainting", IEEE Transactions on Image Processing, vol. 13, No. 9, pp. 1-13 (Sep. 2004).

(Continued)

*Primary Examiner* — Hung Lam
(74) *Attorney, Agent, or Firm* — Finch & Maloney PLLC

(57) ABSTRACT

A digital camera is configured to display a continually updated preview image of an observed scene, wherein kinetic objects that appear in the observed scene do not appear in the continually updated preview image. An observed scene includes static objects and kinetic objects. The observed scene is recorded using a digital imaging sensor which forms part of a smartphone. A live camera feed results, the live camera feed comprising a plurality of frames, each depicting the observed scene at a specific time. A median color value is evaluated over m non-consecutive frames captured from the live camera feed. The median color values are used to generate an output feed that is displayed at a reduced frame rate as compared to the live camera feed. The resulting displayed scene includes the same static objects which appeared in the observed scene, but does not include the kinetic objects.

20 Claims, 6 Drawing Sheets

(56) References Cited

U.S. PATENT DOCUMENTS

| | | | |
|---|---|---|---|
| 8,620,029 B2 | 12/2013 | Dhawan et al. | |
| 9,087,402 B2* | 7/2015 | Doolittle | G06T 19/006 |
| 2005/0129324 A1 | 6/2005 | Lemke | |
| 2006/0192867 A1* | 8/2006 | Yosefin | H04N 5/3535 |
| | | | 348/273 |
| 2007/0031003 A1 | 2/2007 | Cremers | |
| 2010/0027961 A1* | 2/2010 | Gentile | G06T 5/50 |
| | | | 386/278 |
| 2010/0296748 A1 | 11/2010 | Shechtman et al. | |
| 2011/0050864 A1* | 3/2011 | Bond | H04N 13/026 |
| | | | 348/51 |
| 2011/0091127 A1* | 4/2011 | Kisilev | G06T 5/002 |
| | | | 382/274 |
| 2012/0051429 A1* | 3/2012 | Kim | H04N 7/0127 |
| | | | 375/240.16 |
| 2012/0092357 A1 | 4/2012 | Wang et al. | |
| 2012/0213404 A1 | 8/2012 | Steiner | |
| 2013/0021368 A1 | 1/2013 | Lee et al. | |
| 2013/0051685 A1 | 2/2013 | Shechtman et al. | |
| 2014/0169667 A1 | 6/2014 | Xiong et al. | |
| 2015/0156468 A1* | 6/2015 | Moriguchi | H04N 9/045 |
| | | | 348/224.1 |
| 2015/0297949 A1* | 10/2015 | Aman | G06T 7/246 |
| | | | 348/157 |
| 2016/0148362 A1 | 5/2016 | Bedi et al. | |

OTHER PUBLICATIONS

Tomasi, et al., "Detection and Tracking of Point Features", Carnegie Mellon University Technical Report CMU-CS-91-132 (Apr. 1991).
Notice of Allowance in related U.S. Appl. No. 14/554,321 sent Feb. 22, 2017, 8 pages.

* cited by examiner

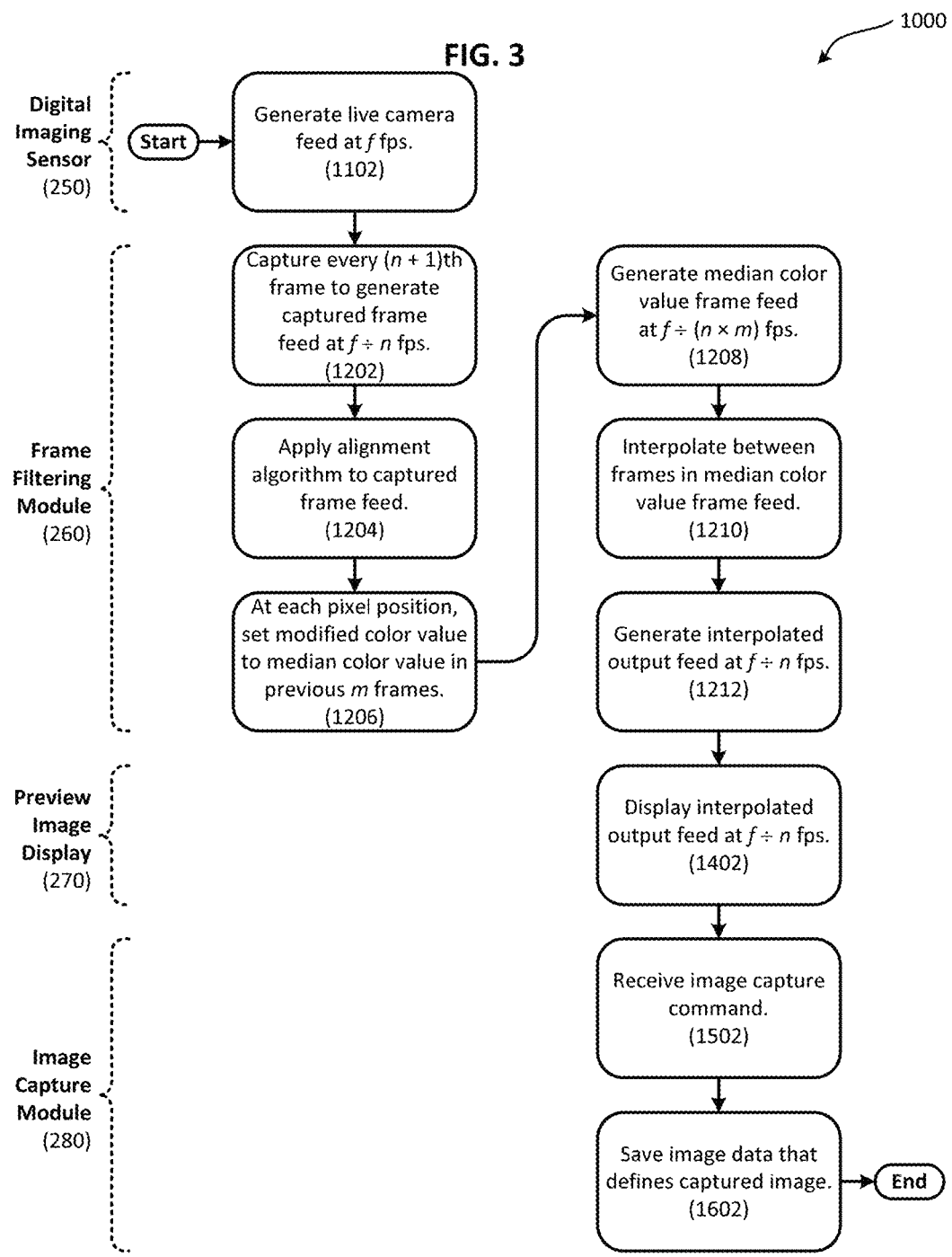

FIG. 4

| Feed | Frame Rate (fps) | Description |
|---|---|---|
| Live Camera Feed (30) | $f$ | A sequence of frames that is generated by digital imaging sensor (250), and that represents observed scene (10). |
| Captured Frame Feed | $f \div n$ | A sequence of frames that is generated by capturing every $(n + 1)$th frame from the live camera feed (30). |
| Median Color Value Frame Feed | $f \div (n \times m)$ | A sequence of frames wherein the color value of each pixel position in each frame is equal to the median color value over the previous $m$ frames in the captured frame feed. |
| Interpolated Output Feed (40) | $f \div n$ | A sequence of frames that is generated by interpolating a quantity of new frames between each frame in the median color value frame feed. |

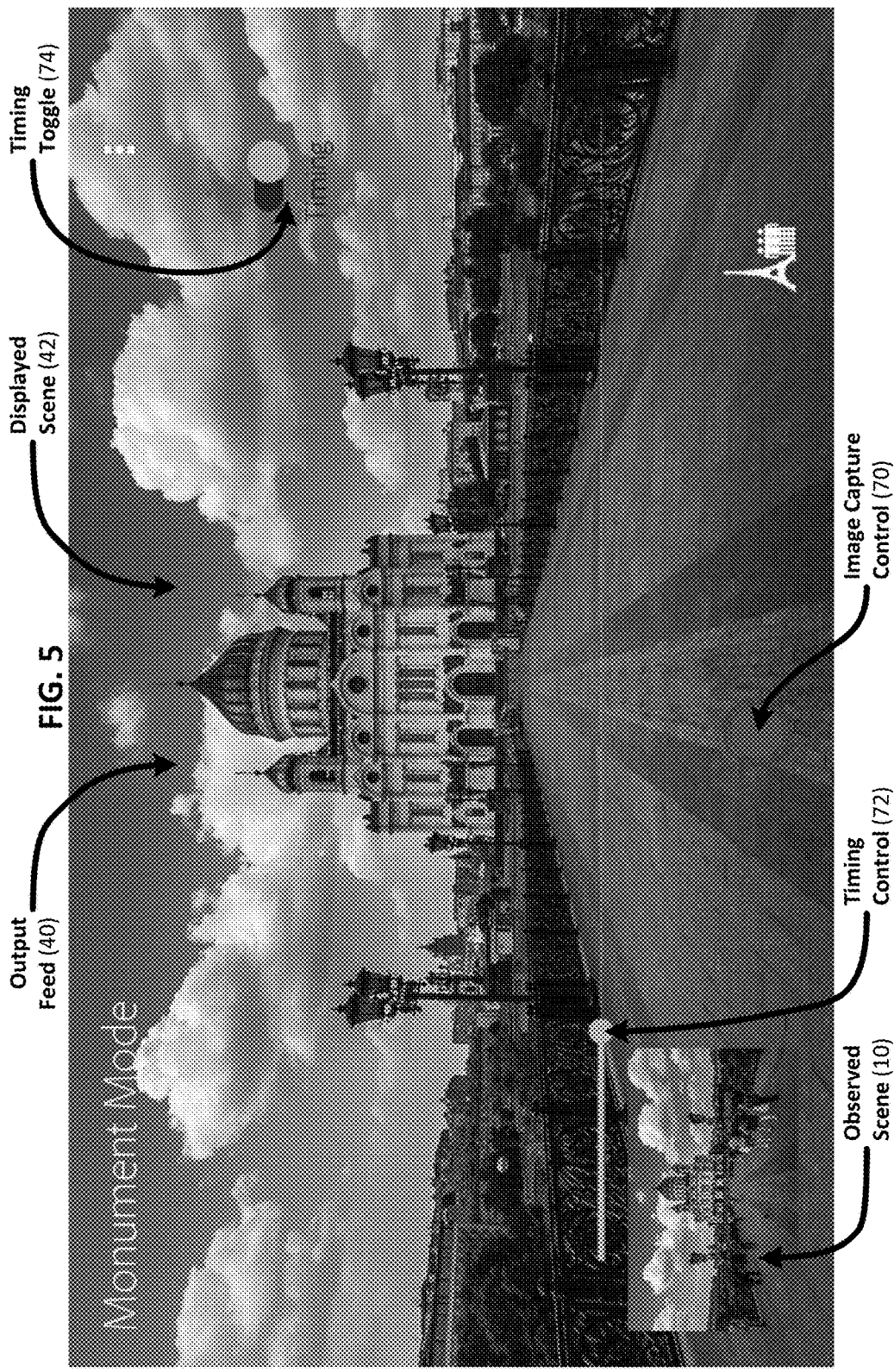

FIG. 6

Generate a live camera feed that is representative of an observed scene that contains a static object and a kinetic object, wherein the live camera feed comprises a plurality of frames, each of which comprises a plurality of pixels, and wherein each of the pixels has an initial color value.
(6100)

Generate a median color value frame feed that comprises a plurality of modified frames, wherein each of the modified frames comprises a plurality of modified pixels, wherein each of the modified pixels has a modified color value, and wherein the modified color value for a particular modified pixel is a median color value of $m$ initial color values for corresponding pixels in a subset of $m$ frames that are included in the live camera feed.
(6200)

Display, on a display device that forms part of a digital camera used to generate the live camera feed, an output feed that includes the plurality of modified frames, and that further includes a plurality of interpolated frames that are inserted between multiple pairs of the modified frames.
(6300)

KINETIC OBJECT REMOVAL FROM CAMERA PREVIEW IMAGE

FIELD OF THE DISCLOSURE

This disclosure relates generally to digital image processing techniques, and more specifically to methods for removing kinetic objects, also referred to as moving objects, from a camera preview image in substantially real-time.

BACKGROUND

Digital cameras have become increasingly commonplace and are now available to consumers in many forms, including as point-and-shoot compact cameras and more complex single lens reflex cameras. Digital cameras are also often integrated into a wide range of other consumer electronic devices, including smartphones, tablet computers, and laptop computers. One feature associated with digital cameras that has proven especially popular with consumers, and that film cameras cannot provide, is the ability to show a continually updated preview image on a display as the user is preparing to capture an image. Indeed, many digital cameras have no optical viewfinder at all, and instead rely entirely on the preview image display to allow the user to frame an intended photograph. This continually updated preview image can be understood as displaying a digital video stream that originates at a digital image sensor within the camera, and that comprises a sequence of individual video frames which are displayed at a suitable frame rate. In addition to helping a photographer compose his or her shot, the preview image display also provides an easy way to view previously captured images and experiment with various visual effects which can be applied to an image.

Digital cameras therefore provide convenience and the ability to produce high quality images without the hassle, limitations, and cost associated with conventional film processing. However, existing digital cameras are not immune to the various photographic inconveniences which photographers have grappled with for years. For example, when photographing static objects or people, such as a group of tourists posing in front of the Arc de Triomphe, kinetic objects such as automobiles and passersby may spoil the shot. The intended subject may be partially or completely obscured by a person walking through the image foreground. Or a passing car may create an unwanted distraction in the image background. An image editing software application can be used to manipulate captured images after image data has been retrieved from the camera. Adobe® Photoshop® (Adobe Systems Incorporated, San Jose, Calif.) is one example of an image editing software application that can be used to remove an unwanted object from an image, and to replace it with a visually plausible scene, thereby producing a modified image that seems reasonable to the human eye.

Unwanted objects are particularly likely to enter the scene being photographed in crowded areas, such as at tourist attractions, where there are many people milling about. It also often occurs near busy streets, thus presenting the photographer with the challenge of "timing" the shot accurately to avoid including unwanted traffic in the picture. And while these are just two examples of situations where this challenge arises, unwanted objects can spoil photographs nearly anywhere. In the past, photographers have dealt with this challenge by attempting to carefully control the scene being photographed, although this is often impossible in heavily trafficked areas or when spontaneous photographs are sought. With the advent of digital photography it has become possible, in some cases, to remove unwanted objects from a photograph using an image editing software application. However, post-processing can require a level of skill and familiarity with the software that many users lack. Post-processing also takes time and often must be performed using a device other than that used to capture an image in the first place. These limitations represent substantial challenges to photographers faced with unwanted objects encroaching on their subjects, and especially, to photographers operating in crowded areas.

BRIEF DESCRIPTION OF THE DRAWINGS

FIG. 3 is a flowchart schematically illustrating an example method for filtering frames from a live camera feed to produce an output feed that does not include kinetic objects.

FIG. 4 is a table listing characteristics of video feeds which are generated in certain implementations of the kinetic object removal techniques disclosed herein.

FIG. 5 is a screenshot that includes an image of an example observed scene that includes kinetic objects, as well as a filtered displayed scene from which the kinetic objects have been removed.

FIG. 6 is a flowchart illustrating an example digital imaging process for filtering frames from a live camera feed.

DETAILED DESCRIPTION

Figure 1:
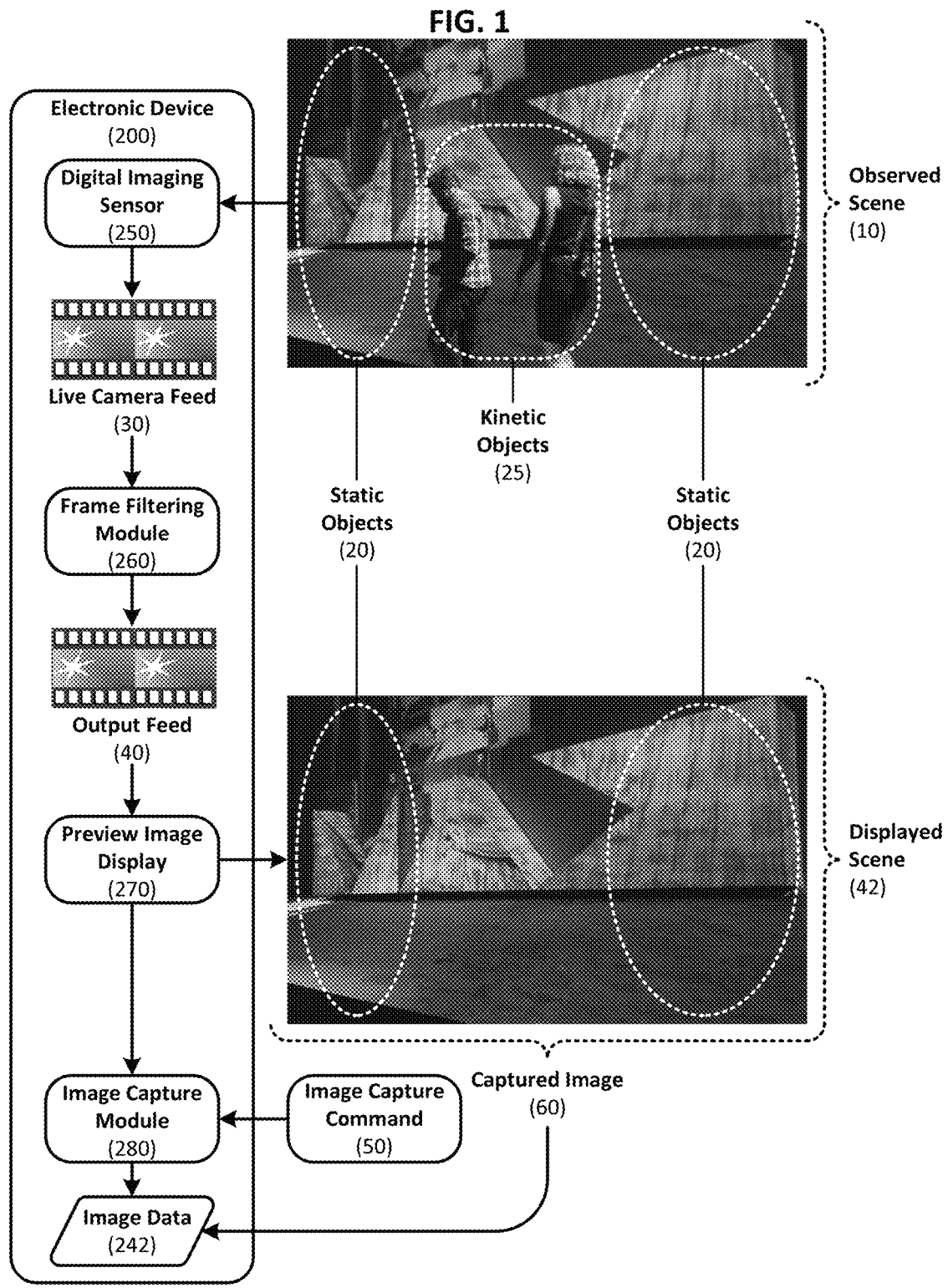
FIG. 1 is a data flow diagram schematically illustrating data flows in an example kinetic object removal technique that includes removing frames from a live camera feed to produce an output feed that does not include kinetic objects.

In accordance with certain of the embodiments disclosed herein, a digital camera is configured to display a continually updated preview image of an observed scene, wherein kinetic objects that appear in the observed scene do not appear in the continually updated preview image. Such embodiments can be understood with reference to FIG. 1, which is a data flow diagram schematically illustrating data flows in an example kinetic object removal technique. This technique involves removing frames from a live camera feed to produce an output feed that does not include kinetic objects. In particular, FIG. 1 illustrates an observed scene 10 that includes static objects 20 (in this example, a stationary background set) and kinetic objects 25 (in this example, two people walking in front of the background set). Observed scene 10 is recorded using a digital imaging sensor 250 which forms part of an electronic device 200, such as a digital camera or a smartphone. The result is a live camera feed 30 that comprises a plurality of frames, each depicting observed scene 10 at a specific time.

Live camera feed 30 is provided to a frame filtering module 260 that also forms part of electronic device 200. In such embodiments, frame filtering module 260 evaluates a median color value over m non-consecutive frames captured from live camera feed 30. Use of median color values allows transient color changes such as are apt to be caused by kinetic objects 25 to be ignored. For example, consider a black car passing in front of, and briefly obscuring, a white background. A particular pixel used to represent this scene will be white in most frames, although in a few frames the pixel may appear black as the car passes by. A median color value of the pixel that is calculated over a large quantity of frames will be white, since the pixel will be black in only a few of the frames. This calculation can be repeated for each (x, y) pixel position over a period corresponding to a number of frames in live camera feed 30. The result will be a median color value frame in which each pixel is a median color value. As noted above, these median color values will be unaffected by transient color changes due to kinetic objects, such as the black car in the example above. This process can be repeated continually so as to produce a median color value frame feed, each frame of which comprises only median color values.

The median color value frame feed can therefore be used to generate an output feed 40 that is displayed on a preview image display 270 at a reduced frame rate as compared to live camera feed 30. As illustrated in FIG. 1, the resulting displayed scene 42 includes the same static objects which appeared in observed scene 10, but does not include kinetic objects 25. A user viewing output feed 40 on preview image display 270 may collect a desired captured image 60 by invoking an image capture command 50, for example by tapping a shutter trigger user interface element. An image capture module 280 generates image data 242 corresponding to captured image 60. This allows the user to snap his or her photograph from output feed 40 without regard to unwanted kinetic objects 25 in observed scene 10. Numerous alternative configurations and modifications will be apparent in light of this disclosure.

Such embodiments help photographers remove unwanted kinetic objects from their photographs in real-time, as the photographs are being composed and shot. This makes it easy for a user to take a snapshot when a suitable image is displayed as part of filtered output feed 40. No time-consuming and complicated post-processing using image editing software is required, thus greatly simplifying the process from the photographer's perspective. The photographer simply places his/her camera in a kinetic object removal mode, and the resulting output feed 40 that is provided in preview image display 270 will not include kinetic objects. This makes it easy for the photographer to, for example, snap a picture of a static subject in a heavily trafficked area without regard to people walking through the shot or distracting traffic on a busy street in the background. It also eliminates guesswork, since existing solutions which require post-processing leave the user unsure, when initially capturing photographs, whether the captured photographs will be sufficient to produce the expected result via post-processing. Because certain of the embodiments disclosed herein show the actual result nearly instantaneously, the user can immediately decide whether a suitable image has been acquired. This is particularly helpful for tourists attempting to take a picture of a popular monument where many people are milling about.

As long as a particular pixel is obscured by a kinetic object only temporarily, the use of the median color values to generate the output feed will allow the scene that is temporarily obscured by the kinetic object to be displayed in the output feed instead of the kinetic object itself. User-configurable parameters can be used to control motion sensitivity, as will be described in turn. Because the output feed contains only static objects, it can be displayed at a reduced frame rate without diminishing the user experience. Use of a reduced frame rate allows kinetic objects that come to rest in the observed scene to gradually fade into the output feed as a static object at a particular location. Likewise, a static object that begins moving will gradually fade out of the output feed. A wide range of other features and advantages will be apparent in view of the disclosure provided herein.

As used herein, the term "color" refers, in addition to its ordinary meaning, to a characteristic of light that can be parametrically defined according to a verity of different multidimensional color models. For example, a red-green-blue (RGB) color model can be used to define a color based on three values (r, g, b) that correspond to the relative contributions of red, green, and blue light, respectively, that are used to form the color. The RGB color model is useful for the sensing, representation, and display of color in electronic systems. Other color models which can be used in conjunction with the various embodiments disclosed herein include the LUV color model defined by the International Commission of Illumination (CIE) in 1976, a hue-saturation-brightness (HSB) color model, and a hue-saturation-luminosity (HSL) color model. These other color models rely on parameters such as hue, brightness, saturation, and luminosity. The parameters used to define a particular color are referred to as "color values". Black and white are included within the definition of the word "color", as used herein.

As used herein, the term "feed" refers, in addition to its ordinary meaning, to a sequence of digital images. In some cases a feed is generated by an imaging sensor (such as in the case of the aforementioned live camera feed 30, which is generated by digital imaging sensor 250) while in the other cases a feed is generated as the result of ongoing digital image processing (such as in the case of the aforementioned output feed 40, which is generated by frame filtering module 260). The individual digital images that comprise a feed are often referred to a "frames", and thus a feed is often characterized in terms of a "frame rate" at which the frames are displayed, generated, or otherwise processed. The frame rate is typically expressed in terms of a number of frames to be processed per unit of time, such as in frames per second. In some cases, if a feed is displayed at an appropriate frame rate, the ongoing display can give the impression of natural motion. The terms "feed" and "stream" are sometimes used interchangeably.

As used herein, the term "median color value" refers, in addition to its ordinary meaning, the median value of a plurality of color values. The plurality of color values may be, for example, the color value of a particular pixel as observed in a plurality of frames comprising a feed. Thus, for example, if a particular pixel has an (r, g, b) color value of (255, 255, 255) (white) in frames 1 through 30, a color value of (0, 0, 0) (black) in frames 31-60, and a color value of (255, 255, 255) (white) in frames 61-90, then the median color value over all 90 frames is (255, 255, 255) (white).

As used herein, the term "static object" refers, in addition to its ordinary meaning, to an object that appears in a feed, and that does not appear to have substantial movement when the feed is viewed. Because it does not move, a static object can be represented by a group of pixels that (a) have color values that do not substantially change over time, and (b) are located at a substantially constant (x, y) position from frame-to-frame. In this context, small changes in color, for example due to imperceptible, barely perceptible, or transient motion, would not cause median color values to change, and thus would not cause a static object to be removed from a live camera feed. This distinguishes a static object from a kinetic object. As used herein, the term "kinetic object" refers, in addition to its ordinary meaning, to an object that appears in a feed, and that further appears to move when the fed is viewed. As a result, a kinetic object is represented by a group of pixels located at a changing (x, y) position from frame-to-frame. If a kinetic object briefly obscures (for example, passes in front of) a static object, the kinetic object will cause a temporary change in the color values used to represent the static object.

System Architecture

Figure 2:
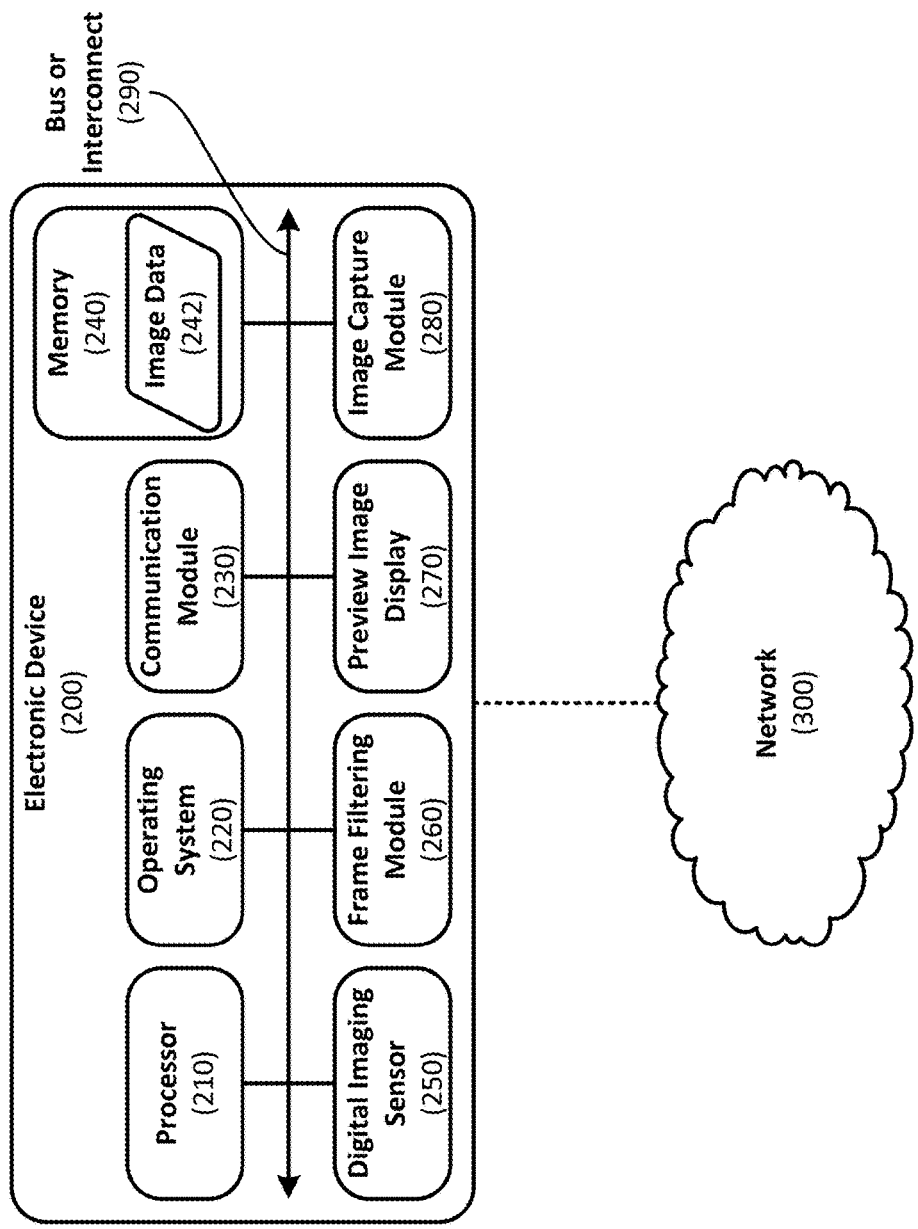
FIG. 2 is a block diagram schematically illustrating selected components of an example electronic device that includes a digital camera, wherein the device is capable of filtering frames from a live camera feed to produce an output feed that does not include kinetic objects.

FIG. 2 is a block diagram schematically illustrating selected components of an example electronic device 200 that includes a digital camera, wherein device 200 is capable of filtering frames from live camera feed 30 to produce output feed 40 from which kinetic objects 25 have been removed. Electronic device 200 may comprise, for example, one or more devices selected from a smartphone, a tablet computer, a laptop computer, a digital camera, or any other computing device capable of digitally recording observed scene 10. A combination of different devices may be used in certain embodiments. In general, the various embodiments disclosed herein can be implemented in conjunction with a wide range of existing or subsequently developed hardware capable of capturing and displaying digital images. In the illustrated embodiment, electronic device 200 includes, among other things, a processor 210, an operating system 220, a communication module 230, a memory 240, digital imaging sensor 250, frame filtering module 260, preview image display 270, and image capture module 280. As can be further seen, a bus and/or interconnect 290 is also provided to allow for inter- and intra-device communications using, for example, communication module 230.

Depending on the particular type of device used for implementation, electronic device 200 is optionally coupled to or otherwise implemented in conjunction with an input/output device such as one or more of a touch sensitive display, a speaker, a printer, an antenna for wireless data communication, a microphone, tactile buttons, and tactile switches. For example, in a particular alternative embodiment wherein electronic device 200 is implemented in the form of a tablet computer, certain functionality is provided in conjunction with a touch sensitive surface that forms part of the tablet computer. Electronic device 200 can optionally be coupled to a network 300 to allow for communications with other computing devices or resources, such as networked image processing services and a networked image repository. However such network connection is optional, and therefore in certain embodiments electronic device 200 can be understood as being capable of autonomously filtering frames from live camera feed 30 to produce output feed 40 from which kinetic objects 25 have been removed. Other components and functionality not reflected in the schematic block diagram of FIG. 2 will be apparent in light of this disclosure, and thus it will be appreciated that other embodiments are not limited to any particular hardware configuration.

Processor 210 can be any suitable processor, and may include one or more coprocessors or controllers, such as an audio processor or a graphics processing unit, to assist in control and processing operations associated with electronic device 200. Operating system 220 may comprise any suitable operating system, such as GOOGLE® ANDROID™ (Google Inc., Mountain View, Calif.), MICROSOFT® WINDOWS® (Microsoft Crop., Redmond, Wash.), or APPLE® OS X® (Apple Inc., Cupertino, Calif.). As will be appreciated in light of this disclosure, the techniques provided herein can be implemented without regard to the particular operating system provided in conjunction with electronic device 200, and therefore may also be implemented using any suitable existing or subsequently developed platform. Communication module 230 can be any appropriate network chip or chipset which allows for wired and wireless connection to other components of electronic device 200 and to network 300, thereby enabling device 200 to communicate with other local and remote computer systems, servers, and resources. One example of such a remote resource is a cloud-based storage resource used to store digital photographs collected using device 200. Memory 240 can be implemented using any suitable type of digital storage, such as one or more of a disc drive, flash memory, or random access memory. In one implementation, memory 240 is used to store image data 242 that defines captured image 60, which has been extracted from output feed 40.

As illustrated in FIG. 2, in certain embodiments electronic device 200 includes hardware components capable of recording observed scene 10 and rendering displayed scene 42. For instance, digital imaging sensor 250 can be understood as comprising any suitable sensor capable of converting detected visible light or other electromagnetic radiation into digital signals. More specifically, digital imaging sensor 250 is capable of continually capturing an ongoing sequence of frames which represent observed scene 10 and which comprise live camera feed 30. Example technologies that can be used to implement digital imaging sensor 250 include semiconductor charge-coupled devices (CCD) and complementary metal-oxide-semiconductor (CMOS) devices. Likewise, preview image display 270 can be understood as comprising any suitable display device capable of rendering a sequence of image frames, such as output feed 40. Example technologies that can be used to implement preview image display 270 include liquid crystal display (LCD) devices and light emitting diode (LED) devices. Preview image display 270 optionally includes a touch sensitive surface that is capable of detecting touch-based user input, such as a tap on a shutter trigger user interface element. Other existing or subsequently developed detector and display technologies can be used in other implementations.

In an example embodiment, frame filtering module 260 comprises instructions encoded on a computer readable medium that, when executed using processor 210, cause a frame filtering process to be invoked. In one implementation, the frame filtering process involves selectively removing certain frames from live camera feed 30, thus resulting in a filtered output feed 40 having a reduced frame rate and modified appearance as compared to live camera feed 30. The frames which are filtered from live camera feed 30 can be understood as containing kinetic objects 25, such that the resulting output feed 40 appears to contain only static objects 20. Thus kinetic objects 25 which may have been present in live camera feed 30 will appear to have been removed from output feed 40. Additionally, while live camera feed 30 has a frame rate f corresponding to the rate at which digital imaging sensor 250 generates frames, output feed 40 has a reduced frame rate f÷n, where n is a user-configurable parameter that determines how much motion an object may have before frame filtering module 260 causes it to be omitted from output feed 40. Users are unlikely to find the reduced frame rate distracting or bothersome because output feed 40 will, in principle, contain only static objects 20. Indeed, using a reduced frame rate advantageously allows kinetic objects 25 that come to rest in observed scene 10 to gradually fade into output feed 40, and allows static objects 20 that begin moving to gradually fade out of output feed 40. This provides a less jarring user experience.

In one implementation, image capture module 280 comprises instructions encoded on a computer readable medium that, when executed using processor 210, cause an image capture process to be invoked. In one implementation, the image capture process involves extracting one or more captured images 60 from output feed 40. Each of the one or more captured images 60 is a still image that corresponds to one of the frames comprising output feed 40. The image capture process can be understood as generating image data 242 that defines the one or more captured images 60. In such implementations image capture module 280 is responsive to image capture command 50, for example which may be detected using a touch sensitive surface that forms part of preview image display 270. For instance, in one particular application image capture module 280 generates a point-and-shoot user interface similar to that used in the context of existing digital camera implementations. Such a user interface can be rendered over the displayed output feed 40 from which kinetic objects 25 have been removed, thus providing an intuitive interface that allows the user to snap a "clean" photograph directly from output feed 40 in real-time.

The embodiments described herein can be implemented in various forms of hardware, software, firmware, or special purpose processors. For example, in one embodiment a non-transitory computer readable medium has instructions encoded thereon that, when executed by one or more processors, cause one or more of the kinetic object removal methodologies described herein to be implemented. The computer readable medium can be integrated into a digital camera or an electronic device including a digital camera, such as a smartphone. The instructions can be encoded using any suitable programming language, such as C, C++, object-oriented C, JavaScript, Visual Basic .NET, BASIC, Scala, or alternatively, using custom or proprietary instruction sets. Such instructions can be provided in the form of one or more computer software applications and/or applets that are tangibly embodied on a memory device, and that can be executed by a computer having any suitable architecture. In one embodiment the system can be hosted on a given website and implemented, for example, using JavaScript or another suitable browser-based technology. The website can be accessed using a browser installed on a smartphone that includes an integrated digital camera.

The functionalities disclosed herein can optionally be incorporated into a variety of different software applications, including mobile applications installed on a smartphone, tablet computer, compact digital camera, digital single lens reflex camera, video camera, or other portable electronic device. The functionalities described herein can additionally or alternatively leverage services provided by, or be integrated into, other software applications, such as digital image or digital video editing software applications. Thus, while certain embodiments disclosed herein are described in the context of removing kinetic objects from a live camera feed in real-time, in alternative implementations the techniques disclosed herein can be used to remove kinetic objects from a previously recorded video asset. The computer software applications disclosed herein may include a number of different modules, sub-modules, or other components of distinct functionality, and can provide information to, or receive information from, still other components and services. These modules can used, for example, to communicate with input and/or output devices such as a display screen, a touch sensitive surface, a printer, and any other suitable input/output device. Other components and functionalities not reflected in the illustrations will be apparent in light of this disclosure, and it will be appreciated that the present disclosure is not intended to be limited to any particular hardware or software configuration. Thus in other embodiments the components illustrated in FIG. 2 may include additional, fewer, or alternative subcomponents.

The aforementioned non-transitory computer readable medium may be any suitable medium for storing digital information, such as a hard drive, a server, a flash memory, and/or random access memory. In alternative embodiments, the computers and modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that the present disclosure is not intended to be limited to any particular system architecture.

Methodology

FIG. 3 is a flowchart schematically illustrating an example method 1000 for filtering frames from live camera feed 30 to produce output feed 40 from which kinetic objects 25 have been filtered. As can be seen, method 1000 includes a number of phases and sub-processes, the sequence of which may vary from one embodiment to another. However, when considered in the aggregate, these phases and sub-processes form part of an improved kinetic object removal technique that is capable of removing kinetic objects from a camera preview image in substantially real-time. Real-time processing can be achieved, for example, by using the graphics processing unit of a computing device, and in the context of the Android operating system, can be implemented using the Renderscript application programming interface. As used herein, performing an action "in real-time" or "in substantially real-time" refers to performing the action without perceptible delay to a user.

Method 1000 is responsive to user input, user-defined configuration settings, and detected imagery in accordance with certain of the embodiments disclosed herein. Method 1000 can be implemented, for example, using an electronic device having the architecture illustrated in FIG. 2 and described herein. Such architecture can be provided, for instance, in the form of a digital camera or any other portable electronic device including a digital camera. Other systems can be used in other embodiments, as will be apparent in light of this disclosure. To this end, the correlation of the various functionalities shown in FIG. 3 to the specific components illustrated in FIG. 2 is not intended to imply any structural or use limitations. Rather, other embodiments may include, for example, varying degrees of integration wherein multiple functionalities are effectively performed by one system or module. For example, in an alternative embodiment a single module is used to filter frames from a live camera feed, thereby generating a filtered output feed, and to capture still images from the filtered output feed. Thus other embodiments may have fewer or more modules depending on the granularity of implementation. Numerous variations and alternative configurations will be apparent in light of this disclosure. FIG. 4 is a table listing characteristics of video feeds which are generated in certain implementations of the kinetic object removal techniques disclosed herein.

As illustrated in FIG. 3, method 1000 commences with using digital imaging sensor 250 to generate live camera feed 30, which has a frame rate f. See reference numeral 1102 in FIG. 3. Live camera feed 30 represents observed scene 10, which, in general, may contain both static objects 20 and kinetic objects 25. A wide range of existing digital imaging sensor technologies are capable of generating a live camera feed that, when rendered on a display device, provides a continually updated representation of an observed scene in real-time. For example, in one implementation, digital imaging sensor 250 generates live camera feed 30 having a frame rate f=30 frames per second (fps). In principle, such a frame rate would be sufficient to provide a continually updated representation of observed scene 10 in real-time. However, in certain embodiments live camera feed 30 is further processed and modified before rendering, as will be described in turn.

For instance, in an example implementation the frame filtering process invoked by frame filtering module 260 commences with capturing every (n+1)th frame from live camera feed 30, thus producing a "captured frame feed" having a frame rate of f÷n fps. See reference numeral 1202 in FIG. 3. Here, n can be understood as a user-configurable parameter that determines how much motion an object may have before frame filtering module 260 causes it to be omitted from output feed 40. In particular, reducing the parameter n will cause objects with relatively little motion, or objects that stop moving only briefly, to begin to produce artifacts in output feed 40. Likewise, increasing the parameter n will cause output feed 40 to be unaffected by objects with relatively little motion or objects that stop moving only briefly. Thus, when frame filtering method 1000 is applied to an observed scene having faster kinetic objects, the number of frames n to be removed between captured frames can be reduced. Reducing n also has the effect of increasing the frame rate of output feed 40. In one embodiment, the user-configurable parameter n is between 2 and 50, in another embodiment the user-configurable parameter n is between 5 and 20, and in another embodiment the user-configurable parameter n is between 8 and 12. In one particular embodiment, n=10.

The frame filtering process invoked by frame filtering module 260 optionally applies an alignment algorithm to live camera feed 30 or the captured frame feed. See reference numeral 1204 in FIG. 3. An alignment algorithm can reduce jitter caused by, for example, an unsteady hand on the camera or other unwanted motion. Reducing such unwanted motion can also increase the accuracy of frame filtering method 1000 since unwanted camera motion could be interpreted as object motion that should be filtered from live camera feed 30. A wide range of existing or subsequently developed alignment algorithms can be used to reduce or eliminate such unwanted motion.

Each frame in the captured camera feed can be understood as comprising a plurality of pixels, wherein each pixel is associated with a color value that parametrically defines the color of that particular pixel. More specifically, the pixel color values can be parametrically defined according to a variety of different multidimensional color models, examples of which include the aforementioned RGB and LUV color models. In some cases one or more of the frames comprising captured frame feed may comprise a multispectral image that includes image data at frequencies outside the visible portion of the electromagnetic spectrum. For example, in one implementation the captured frame feed may include data in seven, ten, twelve, or more spectral channels. Examples of such spectral channels that are invisible to the human eye include infrared wavelengths of 0.7 μm to greater than 10 μm, classified as near infrared, middle and far infrared.

In certain implementations, the frame filtering process invoked by frame filtering module 260 generates a modified color value for a particular pixel in a given frame based on the color values of that same pixel in the previous m frames. More specifically, in one implementation the frame filtering process sets the modified color value for the particular pixel to be equal to the median color value for that same pixel in the previous m frames of the captured frame feed. See reference numeral 1206 in FIG. 3. In this context, the term "same pixel" refers to a pixel located at an identical (x, y) position in a different frame. Where the color values are defined using a multidimensional color model, such as the RGB color model, the median value for each color channel can be determined separately. For example, the median values of the red, green, and blue color channels can be combined to define a composite median color value. Setting a modified color value using a median operation over m frames insulates the modified color value from brief color changes, for example which might be caused by kinetic objects 25 passing through observed scene 10. In particular, if kinetic object 25 causes a pixel to briefly change colors over the course of the previous m frames, this brief change is unlikely to affect the modified color values produced by frame filtering module 260. A frame generated using the modified color values therefore will be less likely to include artifacts caused by the aforementioned kinetic object.

In this context, m can be understood as a user-configurable parameter that determines how much motion an object may have before frame filtering module 260 causes it to be omitted from output feed 40. In particular, reducing the parameter m will cause objects with relatively little motion, and objects that stop moving only briefly, to begin to produce artifacts in output feed 40. Likewise, increasing the parameter m will cause output feed 40 to be unaffected by objects with relatively little motion and objects that stop moving only briefly. Thus, when frame filtering method 1000 is applied to an observed scene having faster kinetic objects, the number of frames m to be removed between captured frames can be reduced. Because the parameters n and m each have a similar effect on frame filtering method 1000, in certain embodiments only one of these parameters is user-configurable, thus allowing for a simplified user interface. In one embodiment, the user-configurable parameter m is between 2 and 50, in another embodiment the user-configurable parameter m is between 5 and 20, and in another embodiment the user-configurable parameter m is between 8 and 12. In one particular embodiment, m=10.

As described above, in certain embodiments the frame filtering process invoked by frame filtering module 260 generates modified color values for each pixel in a given frame. The result is a modified frame that is based on the median color values over the previous m frames. This process of producing a modified frame for each preceding group of m frames in the captured frame feed can be repeated. The result is a sequence of modified frames, wherein the color value of each pixel position in each modified frame is equal to the median color value over the previous m frames in the captured frame feed. The sequence of modified frames is referred to herein as a "median color value frame feed" since the frames are derived based on the median color values over the preceding m frames. Thus in such embodiments the frame filtering process invoked by frame filtering module 260 generates the median color value frame feed having a frame rate of f÷(n×m) fps. See reference numeral 1208 in FIG. 3.

The median color value frame feed has a significantly reduced frame rate as compared to live camera feed 30. In particular, the frame rate of live camera feed 30 is reduced by a factor of n×m to produce the median color value frame feed. Thus, for example, in a case where live camera feed has a frame rate of 30 fps and the user-configurable parameters n=m=10, the median color value frame feed will have a frame rate of 0.3 fps. A frame rate this slow may seem sluggish to users, and may result in objects appearing in, or disappearing from, output feed 40 a relatively long time after they stop or begin moving, respectively. To address these concerns, in certain embodiments the frame filtering process invoked by frame filtering module 260 optionally performs an interpolation between frames in the median color value frame feed. See reference numeral 1210 in FIG. 3. Such an interpolation may involve inserting a quantity of interpolated frames between adjacent frames of the median color value frame feed. As the name suggests, the pixels that comprise each of these interpolated frames have a color value that is interpolated between corresponding pixels in the adjacent frames of the median color value frame feed. In one embodiment, the number of additional frames that is added as a result of interpolation is equal to the number of frames m consolidated in the process of generating the median color value frame feed. In such case, performing the interpolation results in an interpolated output feed, also more simply referred to herein as output feed 40, having a frame rate of f÷n fps. See reference numeral 1212 in FIG. 3.

Output feed 40 can be displayed to the user via preview image display 270. See reference numeral 1402 in FIG. 3. In embodiments wherein the number of frames consolidated in generating the median color value frame feed (m) is equal to the number of frames added through interpolation, output feed 40 will be displayed at a frame rate of f÷n fps. However, the number of frames consolidated and added in these processes need not be equal, and thus output feed 40 may be displayed using a different frame rate in other embodiments. Output feed 40 provides a view of observed scene 10 that excludes kinetic objects 25. In certain embodiments output feed 40 is continually updated in real-time, such that kinetic objects 25 that come to rest in observed scene 10 gradually fade into output feed 40. Likewise, stationary objects 10 that begin moving in observed scene 10 will gradually fade out of output feed 40. The amount of time it takes for kinetic object 25 to fade out of (or fade into) output feed 40 depends on the user-configurable parameters n and m, with higher values corresponding to a lower frame rate for output feed 40, and thus a longer fade in/out time. In example implementations the fade in/out time is less than 10 seconds, less than 8 seconds, less than 5 seconds, less than 3 seconds or less than 1 second. Other fade in/out values can be used in other embodiments. Output feed 40 therefore allows a user to frame his/her shot in real-time without regard to kinetic objects 25 which may be present in observed scene 10.

Preview image display 270 optionally includes a touch sensitive surface that is capable of detecting touch-based user input, such as a tap on a shutter trigger user interface element. Such input can define image capture command 50, although in alternative embodiments image capture command 50 can additionally or alternatively be defined by other user input. Examples of such alternative user input include speaking a voice command, pressing a shutter button, and smiling at a camera operating in conjunction with a facial expression detection algorithm. In certain embodiments the image capture process invoked by image capture module 280 generates the type of point-and-shoot user interface that is often used in the context of existing digital camera implementations. Such a user interface can be rendered over the displayed output feed 40 from which kinetic objects 25 have been removed, thus providing an intuitive interface that allows the user to snap a "clean" photograph directly from output feed 40 in real-time.

Image capture module 280 is therefore configured to receive image capture command 50, and in response, save image data 242 that defines the resulting captured image 60. See reference numerals 1502 and 1602 in FIG. 3. Thus, as a user observes output feed 40—from which kinetic objects 25 have filtered—the user can invoke image capture command 50 when satisfied with the appearance of displayed scene 42. The resulting captured image 60 corresponds to an frame that forms part of, and that is extracted from, output feed 40. The extracted frame corresponds to the time at which the user invoked image capture command 50. Captured image 60 is optionally displayed using preview image display 270, thus providing the user an opportunity to evaluate captured image 60. The user is thus able to capture an image from which kinetic objects 25 have already been removed at the time of capture, thus minimizing or eliminating any need for post-processing operations.

User Interface

FIG. 5 is a screenshot that includes an image of an example observed scene 10 that includes kinetic objects, as well as a displayed scene 42 from which the kinetic objects have been removed. Displayed scene 42 represents one particular frame that forms part of output feed 40, and thus, in the context of the momentary screenshot illustrated in FIG. 5, output feed 40 and displayed scene 42 can be understood as being synonymous. In the illustrated embodiment, observed scene 10 and output feed 40 are displayed simultaneously, while in other embodiments the preview image of observed scene 10 can be resized or removed according to user preference. The example user interface illustrated in FIG. 5 also includes an image capture control 70 which can be used to invoke image capture command 50. In certain embodiments image capture control 70 has an appearance that resembles a shutter control button.

The example user interface illustrated in FIG. 5 also includes a timing control 72 and a timing toggle 74. Timing control 72 allows a user to adjust one or more of the user-configurable parameters n and m using a slider-type user interface element. For example, in one implementation wherein the parameters n and m are equal, adjusting timing control 72 causes both parameters to be adjusted to the same value. In an alternative implementation, either one of these parameters is fixed, while the other is adjustable using timing control 72. Timing control 72 is adjustable in real-time, as the user is viewing output feed 40, thus providing the user with nearly instantaneous feedback on how an adjustment affects output feed 40, if at all. Timing toggle 74 can be used to toggle the display of timing control 72, thus allowing timing control 72 to be removed from the user interface after the user determines that further adjustments are unnecessary, or that timing control 72 is a distraction from the display of output feed 40.

Further Example Embodiments

Numerous variations and configurations will be apparent in light of this disclosure. For instance, as illustrated in FIG. 6, one example embodiment provides a non-transitory computer readable medium having instructions encoded thereon that, when executed by one or more processors, cause a digital imaging process to be carried out. As illustrated in FIG. 6, in one example embodiment a digital imaging process 6000 includes generating a live camera feed that is representative of an observed scene that contains a static object and a kinetic object. The live camera feed includes a plurality of frames, each of which includes a plurality of pixels. Each of the pixels has an initial color value. See reference numeral 6100 in FIG. 6. See also reference numeral 1102 in FIG. 3, which indicates that method 1000 for filtering frames from a live camera feed includes generating the live camera feed at f fps.

Method 6000 further includes generating a median color value frame feed that includes a plurality of modified frames. Each of the modified frames includes a plurality of modified pixels. Each of the modified pixels has a modified color value. The modified color value for a particular modified pixel is a median color value of m initial color values for corresponding pixels in a subset of m frames that are included in the live camera feed. See reference numeral 6200 in FIG. 6. See also reference numeral 1208 in FIG. 3, which indicates that method 1000 for filtering frames from a live camera feed includes generating a median color value frame feed at f÷(n×m) fps, where n and m are user-configurable parameters that determine how much motion an object may have before it is omitted from an output feed.

Method 6000 further includes displaying, on a display device that forms part of a digital camera used to generate the live camera feed, an output feed that includes the plurality of modified frames, and that further includes a plurality of interpolated frames that are inserted between multiple pairs of the modified frames. See reference numeral 6300 in FIG. 6. See also reference numeral 1402 in FIG. 3, which indicates that method 1000 for filtering frames from a live camera feed includes displaying an interpolated output feed at f÷n fps.

In some cases the particular modified pixel and the corresponding pixels are located at a same (x, y) frame position. In some cases the static object is visible in the output feed, while the kinetic object is not visible in the output feed. In some cases the digital imaging process further includes (a) receiving an image capture command that is associated with a frame selected from frames included in the output feed; and (b) displaying, on the display device, a still image corresponding to the selected frame. In some cases the digital imaging process further includes positioning m interpolated frames between adjacent modified frames, thereby producing the output feed. In some cases (a) a particular interpolated frame includes a plurality of interpolated pixels; and (b) each of the interpolated pixels has an interpolated color value that is between (i) a modified color value of a corresponding pixel in a modified frame that is before the particular interpolated frame in the output feed, and (ii) a modified color value of a corresponding pixel in a modified frame that is after the particular interpolated frame in the output feed. In some cases (a) each of the initial color values includes at least three color parameters that are set according to a multidimensional color model; and (b) the median color value is determined by calculating a median value for each of the color parameters for the m initial color values for corresponding pixels in the subset of m frames. In some cases (a) the digital imaging process further includes generating a captured frame feed by capturing a first subset of the plurality of frames; and (b) the modified color value for the particular modified pixel is a median color value of m initial color values for corresponding pixels in a subset of m consecutive frames that are included in the captured frame feed. In some cases (a) the digital imaging process further includes generating a captured frame feed by capturing every (n+1)th frame of the live camera feed; and (b) the modified color value for the particular modified pixel is a median color value of m initial color values for corresponding pixels in a subset of m frames that are included in the captured frame feed. In some cases the digital camera includes a digital imaging sensor that is used to generate the live camera feed.

Another example embodiment provides a computer-implemented method of taking a photograph. The method includes receiving a live camera feed that is representative of an observed scene that contains a static object and a kinetic object. The live camera feed includes a plurality of frames, each of which includes a plurality of pixels. Each of the pixels has an initial color value. The method further includes generating a median color value frame feed that includes a plurality of modified frames. Each of the modified frames includes a plurality of modified pixels. Each of the modified pixels has a modified color value. The modified color value for a particular modified pixel is calculated based on initial color values for corresponding pixels in a subset of the frames that are included in the live camera feed. The method further includes generating an output feed that includes the plurality of modified frames, and that further includes a plurality of interpolated frames that are inserted amongst the modified frames. The kinetic object is not visible in the output feed. The method further includes displaying the output feed on a display device. The method further includes receiving an image capture command that is associated with a frame selected from frames comprising the output feed. The method further includes storing image data that defines the selected frame. In some cases (a) a new object fades into view in the output feed in response to the new object coming to rest in the observed scene; and (b) the new object fades into view over a period of less than ten seconds. In some cases the image capture command is received via a touch sensitive surface that forms part of the display device. In some cases the method further includes displaying a timing slider on the display device over the output feed, wherein moving the timing slider causes a frame rate of the output feed to be adjusted. In some cases the method further includes generating a captured frame feed by capturing a first subset of the plurality of frames, wherein the modified color value for the particular modified pixel is a median color value of m initial color values for corresponding pixels in a subset of m consecutive frames that are included in the captured frame feed. In some cases the method further includes generating a captured frame feed by capturing every (n+1)th frame of the live camera feed, wherein the captured frame feed has a frame rate that is less than a frame rate of the live camera feed, but that is greater than a frame rate of the median color value frame feed.

Another example embodiment provides a digital imaging system. The system includes a digital imaging sensor. The system further includes a display screen. The system further includes a memory device. The system further includes a processor that is operatively coupled to the digital imaging sensor, the display screen, and the memory device. The processor is configured to execute instructions stored in the memory device that, when executed, cause the processor to carry out a digital imaging process. The digital imaging process includes receiving a live camera feed generated by the digital imaging sensor. The live camera feed is representative of an observed scene that contains a static object and a kinetic object. The live camera feed comprises a plurality of frames. Each of the plurality of frames comprises a plurality of pixels. Each of the pixels has an initial color value. The digital imaging process further includes generating a captured frame feed by capturing a first subset of the plurality of frames. The digital imaging process further includes generating a median color value frame feed that comprises a plurality of modified frames. Each of the modified frames comprises a plurality of modified pixels. Each of the modified pixels has a modified color value. The modified color value for a particular modified pixel is calculated based on initial color values for corresponding pixels in a second subset of frames that are included in the captured frame feed. The digital imaging process further includes generating an output feed that includes the plurality of modified frames, and that has an increased frame rate as compared to a frame rate of the median color value frame feed. The kinetic object is not visible in the output feed. The static object is visible in the output feed. The digital imaging process further includes displaying the output feed on the display screen. In some cases (a) the digital imaging process further includes receiving an image capture command that defines a selected frame from the output feed; and (b) the image capture command is detected using a touch sensitive surface that forms part of the display screen. In some cases, in response to the static object beginning to move in the observed scene, the static object fades out of the output feed over a period of less than ten seconds. In some cases the digital imaging process further comprises (a) receiving an image capture command that defines a selected frame from the output feed; and (b) responsive to the image capture command, storing image data that is representative of the selected frame in the memory device.

The foregoing disclosure has been presented for the purposes of illustration and description. It is not intended to be exhaustive or to limit the description to the particular described embodiments. Therefore many modifications and variations are possible in light of this disclosure. Thus it is intended that the scope of the invention be limited not by this disclosure, but rather by the claims appended hereto.

What is claimed is:

1. A non-transitory computer readable medium having instructions encoded thereon that, when executed by one or more processors, cause a digital imaging process to be carried out, the process comprising:
   generating a live camera feed that is representative of an observed scene that contains a static object and a kinetic object, wherein the live camera feed comprises a plurality of frames, each of which comprises a plurality of pixels, and wherein each of the pixels has an initial color value;
   generating a median color value frame feed that comprises a plurality of modified frames, wherein each of the modified frames comprises a plurality of modified pixels, wherein each of the modified pixels has a modified color value, and wherein the modified color value for a particular modified pixel is a median color value of m initial color values for corresponding pixels in a subset of m frames that are included in the live camera feed; and
   displaying, on a display device that forms part of a digital camera used to generate the live camera feed, an output feed that includes the plurality of modified frames, and that further includes a plurality of interpolated frames that are inserted between multiple pairs of the modified frames.

2. The non-transitory computer readable medium of claim 1, wherein the particular modified pixel and the corresponding pixels are located at a same (x, y) frame position.

3. The non-transitory computer readable medium of claim 1, wherein:
   the static object is visible in the output feed; and
   the kinetic object is not visible in the output feed.

4. The non-transitory computer readable medium of claim 1, wherein the process further comprises:
   receiving an image capture command that is associated with a frame selected from frames included in the output feed; and
   displaying, on the display device, a still image corresponding to the selected frame.

5. The non-transitory computer readable medium of claim 1, wherein the process further comprises positioning m interpolated frames between adjacent modified frames, thereby producing the output feed.

6. The non-transitory computer readable medium of claim 1, wherein:
   a particular interpolated frame comprises a plurality of interpolated pixels; and
   each of the interpolated pixels has an interpolated color value that is between (a) a modified color value of a corresponding pixel in a modified frame that is before the particular interpolated frame in the output feed, and (b) a modified color value of a corresponding pixel in a modified frame that is after the particular interpolated frame in the output feed.

7. The non-transitory computer readable medium of claim 1, wherein:
   each of the initial color values comprises at least three color parameters that are set according to a multidimensional color model; and
   the median color value is determined by calculating a median value for each of the color parameters for the m initial color values for corresponding pixels in the subset of m frames.

8. The non-transitory computer readable medium of claim 1, wherein:
   the process further comprises generating a captured frame feed by capturing a first subset of the plurality of frames; and
   the modified color value for the particular modified pixel is a median color value of m initial color values for corresponding pixels in a subset of m consecutive frames that are included in the captured frame feed.

9. The non-transitory computer readable medium of claim 1, wherein:
   the process further comprises generating a captured frame feed by capturing every (n+1)th frame of the live camera feed; and
   the modified color value for the particular modified pixel is a median color value of m initial color values for corresponding pixels in a subset of m frames that are included in the captured frame feed.

10. The non-transitory computer readable medium of claim 1, wherein the digital camera includes a digital imaging sensor that is used to generate the live camera feed.

11. A computer-implemented method of taking a photograph, the method comprising:
    receiving a live camera feed that is representative of an observed scene that contains a static object and a kinetic object, wherein the live camera feed comprises a plurality of frames, each of which comprises a plurality of pixels, and wherein each of the pixels has an initial color value;
    generating a median color value frame feed that comprises a plurality of modified frames, wherein each of the modified frames comprises a plurality of modified pixels, wherein each of the modified pixels has a modified color value, and wherein the modified color value for a particular modified pixel is calculated based on initial color values for corresponding pixels in a subset of the frames that are included in the live camera feed;

generating an output feed that comprises the plurality of modified frames, and that further comprises a plurality of interpolated frames that are inserted amongst the modified frames, wherein the kinetic object is not visible in the output feed;

displaying the output feed on a display device;

receiving an image capture command that is associated with a frame selected from frames comprising the output feed; and storing image data that defines the selected frame.

12. The method of claim 11, wherein:

a new object fades into view in the output feed in response to the new object coming to rest in the observed scene; and the new object fades into view over a period of less than ten seconds.

13. The method of claim 11, wherein the image capture command is received via a touch sensitive surface that forms part of the display device.

14. The method of claim 11, further comprising displaying a timing slider on the display device over the output feed, wherein moving the timing slider causes a frame rate of the output feed to be adjusted.

15. The method of claim 11, further comprising generating a captured frame feed by capturing a first subset of the plurality of frames, wherein the modified color value for the particular modified pixel is a median color value of m initial color values for corresponding pixels in a subset of m consecutive frames that are included in the captured frame feed.

16. The method of claim 11, further comprising generating a captured frame feed by capturing every (n+1)th frame of the live camera feed, wherein the captured frame feed has a frame rate that is less than a frame rate of the live camera feed, but that is greater than a frame rate of the median color value frame feed.

17. A digital imaging system that comprises:

a digital imaging sensor;

a display screen;

a memory device; and a processor that is operatively coupled to the digital imaging sensor, the display screen, and the memory device, wherein the processor is configured to execute instructions stored in the memory device that, when executed, cause the processor to carry out a digital imaging process that comprises:

receiving a live camera feed generated by the digital imaging sensor, wherein the live camera feed is representative of an observed scene that contains a static object and a kinetic object, wherein the live camera feed comprises a plurality of frames, wherein each of the plurality of frames comprises a plurality of pixels, and wherein each of the pixels has an initial color value;

generating a captured frame feed by capturing a first subset of the plurality of frames;

generating a median color value frame feed that comprises a plurality of modified frames, wherein each of the modified frames comprises a plurality of modified pixels, wherein each of the modified pixels has a modified color value, and wherein the modified color value for a particular modified pixel is calculated based on initial color values for corresponding pixels in a second subset of frames that are included in the captured frame feed;

generating an output feed that includes the plurality of modified frames, and that has an increased frame rate as compared to a frame rate of the median color value frame feed, wherein the kinetic object is not visible in the output feed, and wherein the static object is visible in the output feed; and displaying the output feed on the display screen.

18. The digital imaging system of claim 17, wherein:

the digital imaging process further comprises receiving an image capture command that defines a selected frame from the output feed; and the image capture command is detected using a touch sensitive surface that forms part of the display screen.

19. The digital imaging system of claim 17, wherein, in response to the static object beginning to move in the observed scene, the static object fades out of the output feed over a period of less than ten seconds.

20. The digital imaging system of claim 17, wherein the digital imaging process further comprises:

receiving an image capture command that defines a selected frame from the output feed; and responsive to the image capture command, storing image data that is representative of the selected frame in the memory device.

* * * * *